(12) United States Patent
Donovan et al.

(10) Patent No.: US 7,731,293 B1
(45) Date of Patent: Jun. 8, 2010

(54) MULTIPLE PART RESIN SEAT BACK WITH INTEGRATED ADJUSTABLE HEADREST SUPPORT

(75) Inventors: Gregory Todd Donovan, Britton, MI (US); Vikas Bhatia, South Lyon, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/341,692

(22) Filed: Dec. 22, 2008

(51) Int. Cl.
*A47C 7/02* (2006.01)
(52) U.S. Cl. .................................................. 297/452.18
(58) Field of Classification Search .................. 297/410, 297/452.18, 452.65
See application file for complete search history.

(56) References Cited

U.S. PATENT DOCUMENTS

| | | | | |
|---|---|---|---|---|
| 3,429,615 | A | * | 2/1969 | Belk ........................... 297/410 |
| 4,390,209 | A | | 6/1983 | Izuno et al. |
| 4,685,739 | A | * | 8/1987 | Deegener et al. ....... 297/452.65 |
| 5,253,924 | A | | 10/1993 | Glance |
| 5,575,533 | A | | 11/1996 | Glance |
| 5,681,093 | A | | 10/1997 | Pfister et al. |
| 5,951,110 | A | | 9/1999 | Conner et al. |
| 6,203,104 | B1 | | 3/2001 | Matsuo et al. |
| 6,536,844 | B2 | | 3/2003 | Huse |
| 6,685,862 | B1 | | 2/2004 | Hanagan |
| 6,739,673 | B2 | * | 5/2004 | Gupta et al. ........... 297/452.65 |
| 7,422,289 | B2 | * | 9/2008 | Kim et al. .............. 297/452.18 |
| 2005/0168041 | A1 | | 8/2005 | Glance et al. |

* cited by examiner

*Primary Examiner*—Milton Nelson, Jr.
(74) *Attorney, Agent, or Firm*—Gifford, Krass, Sprinkle, Anderson & Citkowski, P.C.

(57) ABSTRACT

A seat back support for seat cushioning to be attached thereto and provide a seat component is disclosed. In addition, a process for making the seat back support is also disclosed. The seat back support can have first panel and a second panel. The first panel can have a base portion and a raised portion extending outwardly from the base portion, and the second panel can have a corrugated structure with a channel portion extending from a joining surface. The second panel is fixedly attached to the first panel by having at least part of the raised portion melt and re-solidified while in contact with the joining surface of the second panel.

20 Claims, 2 Drawing Sheets

MULTIPLE PART RESIN SEAT BACK WITH INTEGRATED ADJUSTABLE HEADREST SUPPORT

FIELD OF THE INVENTION

The present invention is related to a seat back support. In particular, the present invention is related to a seat back support made from multiple parts and having an integral adjustable headrest support.

BACKGROUND OF THE INVENTION

Seats for individuals to sit in come in a wide variety of shapes and materials. Typically, a seat will have a seat bottom and a seat back, the seat bottom being the component upon which a person will sit and the seat back providing support for the person's back.

Motor vehicles such as automobiles, trucks, tractors and the like typically have seats with seat bottoms and seat backs with some of the seats operable for the seat back to tilt in a forward and rearward direction. In addition, some seats for motor vehicles are known as 60/40 seats, such a seat typically made from two major sections. One of the sections includes a seating structure for an individual to sit on, along with an adjoining side section that can be used to attach an armrest, or in the alternative, store the armrest in an upright position and provide a seating region for an additional passenger. Such a seating portion is known as the 60 part of the 60/40 seat. The 40 part is simply a single passenger seat.

With the increase of fuel costs and the corresponding desire for increased fuel efficiency, motor vehicles are developed with reduced weight as a goal. However, all of the components of the vehicles, including seat structures, are required to meet Federal Safety Standards. One method of making a seat that is both lightweight and meets appropriate safety standards is to use a polymer as a material of construction fabrication. For example, heretofore seat structures have been made from blow molding of a polymer in order to produce a low cost plastic molding structure having relatively light weight when compared to other materials such as steel, aluminum and the like. For example, U.S. Pat. No. 4,390,209 discloses a plastic seat back frame work and a method of manufacture. Likewise, U.S. Pat. No. 5,253,924 discloses a blow molded seat back with a reinforcing member.

Although lightweight and sufficiently strong seat structures have been provided using blow molding, this method has its limitations. For example, a blow molded component must have a generally uniform thickness throughout the part, the control of the thickness can be less than desirable and the complexity of the component can be limited. As such, seat back supports have been limited to relatively simple shapes that have excess material, excess weight and limited integral attachment features. In addition, blow molded seat back supports have required that steel plates be attached thereto in order for a component such as an armrest and/or an adjustable headrest support structure to be attached thereto.

In light of these limitations, a seat back support having sufficient strength and toughness to meet Federal Safety Standards, and yet be lightweight and incorporate integral attachment structures would be desirable. In addition, a process for making such a seat back structure would also be desirable.

SUMMARY OF THE INVENTION

A seat back support for seat cushioning to be attached thereto and provide a seat component is disclosed. In addition, a process for making the seat back support is also disclosed. The seat back support can have a first panel with a base portion and a raised portion extending outwardly from the base portion. In addition, at least part of the raised portion will have been melted and re-solidified. The seat back support can also include a second panel that has a corrugated structure with a joining surface and a channel portion extending from the joining surface.

The second panel is fixedly attached to the first panel when the melted raised portion is in contact with the joining surface of the second panel and has re-solidified, thereby forming a bond the first and second panels. In some instances, the first panel and/or the second panel can have an outer lip that is also at least partially joined to the opposite panel. Both the raised portion and the outer lip afford for the fixedly attaching of the first panel to the second panel without the use of additional material.

The raised portion can have a joining material portion extending outwardly therefrom, the joining material portion being the melted raised portion that has re-solidified and is in contact with the joining surface of the second panel. The raised portion can be a rib that extends outwardly from the base portion and the joining material portion can be a bead of joining material extending along the rib.

The second panel with the corrugated structure can have a plurality of alternating joining surfaces and channel portions. The plurality of channel portions can have contoured outer surfaces that are dimensioned to generally fit an individual's back that would be sitting against the seat back support. In addition, the second panel can have a first portion with a first thickness and a second portion with a second thickness. The first thickness and the second thickness can be different, and in some instances, the first thickness can be greater than the second thickness by more than 20%, while in other instances greater than 30%. In still other instances, the first thickness can be greater than the second thickness by more than 40%.

The seat back support can have an integral attachment structure, for example an integral adjustable headrest support portion, an integral arm rest attachment bracket and/or an integral seat back pivot bracket. It is appreciated that the seat back support and any integral attachment structures meet all Federal Safety regulations.

A process for making the seat back support can include providing a first panel having a base portion and a raised portion extending outwardly from the base portion. In addition, a second panel is provided, the second panel having a corrugated structure with alternating joining surfaces and channel portions extending from the joining surfaces. The first panel is placed adjacent to the second panel such that the raised portion of the first panel is in contact with at least one of the joining surfaces of the second panel. The first panel is joined to the second panel by melting at least part of the raised portion while it is in contact with at least one of the joining surfaces, the melted material bonding to the joining surface and fixedly attaching the first panel to the second panel. The raised portion of the first panel can also have a bead of joining material extending outwardly therefrom, the bead of joining material being the melted raised portion that re-solidifies and bonds the first panel to the second panel.

The second panel can include an integral attachment component as described above and can also include a first portion with a first thickness and a second portion with a second thickness. The first panel and the second panel can be made by a thin wall molding process, where thin wall is defined as equal to or less than 2.0 millimeters. In some instances, the first panel and the second panel can be made by injection molding and in other instances made by injection compression molding. The raised portion of the first panel can be melted by rapid displacement of the first panel relative to the second panel, for example through the use of vibration welding, ultrasonic welding, and the like. In addition, hot plate melting can be used to melt at least part of the raised portion.

DETAILED DESCRIPTION OF THE INVENTION

Figure 1:
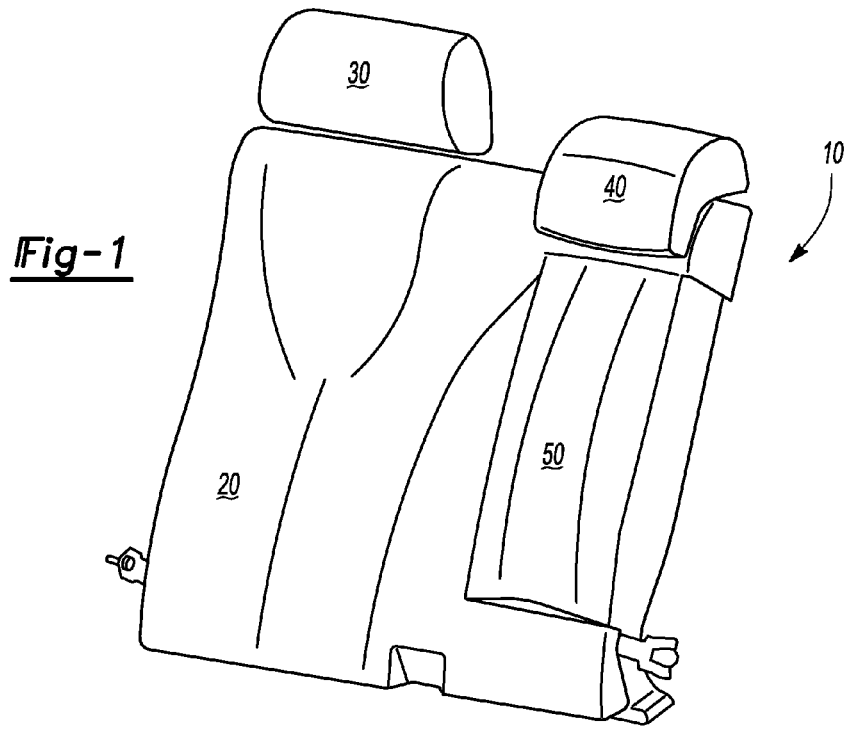
FIG. 1 is a perspective view of an assembled seat back.

The present invention discloses a seat back support that can have seat cushions attached thereto and thereby provide a seat component. Therefore, the present invention has utility as a seat component and as a process for making the seat component.

The seat back support can include a first panel attached to a second panel without the use of any additional material. For the purposes of the present invention, the term "additional material" refers to material such as adhesives, fasteners and the like. As such, the first panel is attached to the second panel using only material that constitutes the first panel and/or the second panel. One of the panels, for example the second panel can include an integral attachment component, for example and for illustrative purposes only, an integral adjustable headrest support portion, an integral arm rest attachment bracket, an integral seat back pivot bracket and the like.

The first panel can have a base portion and a raised portion extending outwardly from the base portion. At least part of the raised portion of the seat back support has been melted and re-solidified. The second panel can have a corrugated structure with a joining surface and a channel portion extending from the joining surface. The raised portion of the first panel that has been melted is in contact with the joining surface of the second panel during the melting, the re-solidification of the melted material forming a bond therebetween and resulting in the second panel being fixedly attached to the first panel.

The first and/or second panel can also have an outer lip, the outer lip affording for additional joining surfaces between the two panels. In some instances, the raised portion and/or a portion of the outer lip can be melted by rapid displacement of the first panel relative to the second panel, for example by vibration welding, ultrasonic welding, and the like. In the alternative, the melting of the raised portion and/or outer lip can be accomplished by hot plate melting. It is appreciated that other methods, techniques, etc., can be used to melt a volume of the raised portion that is proximate to and/or in contact with the joining surface.

The raised portion can also have a joining material portion that extends outwardly therefrom, the joining material portion being in the form of a bead, a button, and the like. The joining material can be melted and re-solidified while it is in contact with the joining surface of the second panel and thereby provide a bond between the raised portion of the first panel and the joining surface of the second panel. The raised portion can be a rib extending outwardly from the base portion, or in the alternative a plurality of button shaped structures extending outwardly from the base portion. The corrugated structure of the second panel can include a plurality of alternating joining surfaces and channel portions that extend outwardly from the joining surfaces.

The channel portions can have contoured outer surfaces, the contour being dimensioned to generally fit an individual's back that would be, or is, pressed against the seat back support. In addition, the channel portions can have a dimension that affords for the use of less foam material typically provided to produce a seat. Stated differently, heretofore seat back supports have been relatively thin and thus require relatively thick amounts of foam material to be attached thereto. However, the seat back support disclosed herein provides sufficient thickness such that less foam material is required when compared to heretofore seat assemblies. It is appreciated that the seat back support disclosed herein, having the first panel fixedly attached to a second panel without the use of additional material meets appropriate safety standards such as Federal Motor Vehicle safety Standards (FMVSS) 202a, 207 and Economic Commission for Europe (ECE) 17.

The second panel can have a variety of channels, ribs, indentations, and the like in order to provide appropriate structural strength, ductility, toughness, desired shape, etc. The first panel and/or the second panel can be made from resin, thermoplastic polymers such as polypropylene and/or polypropylene ethylene, and the like. In some instances, the polymer can be mixed with glass, talc and other type materials that give additional strength properties that are desired.

As stated above, the second panel can include an integral adjustable headrest support portion, the integral adjustable headrest support portion having at least two hollow channels dimensioned to accept an adjustable headrest grommet. In some instances, the second panel can have two integral adjustable headrest support portions, each of the headrest support portions having at least two hollow channels dimensioned to accept an adjustable headrest grommet.

A process for making a seat back support for seat cushioning to be attached thereto and thus provide a seat component can include providing a first panel having a base portion and a raised portion extending outwardly from the base portion. In addition, a second panel having a corrugated structure can be provided, the corrugated structure having alternating joining surfaces and channel portions extending from the joining surfaces. The first panel and the second panel can be made from a thin wall molding process where thin wall is defined for the purposes of the present invention as being equal to or less than 2.0 millimeters. In some instances first panel and/or the second panel can be made by injection molding, while in other instances injection compression molding. The first panel can be placed adjacent to and in contact with the second panel such that the raised portion of the first panel is in contact with at least one of the joining surfaces. Joining of the first panel to the second panel is accomplished by melting at least part of the raised portion while it is in contact with the joining surfaces, the melted portion re-solidifying and providing a bond between the raised portion of the first panel and the joining surface of the second panel. In this manner, the first panel is fixedly attached to the second panel. In some instances, the raised portion can have a bead of joining material extending outwardly therefrom, the bead of joining material being the melted raised portion that re-solidifies during the joining of the first panel to the second panel.

Turning now to FIG. 1, a seat back assembly is shown generally at reference numeral 10. The seat back assembly 10 can include a seat back 20, a first adjustable headrest 30, a second adjustable headrest 40 and an arm rest 50. It is appreciated that the arm rest 50 is in an upright position and affords for a seat back for an individual. It is further appreciated that the seat back assembly 10 shown in FIG. 1 illustrates that foam material is attached to interior support structures that are not shown.

Figure 2:
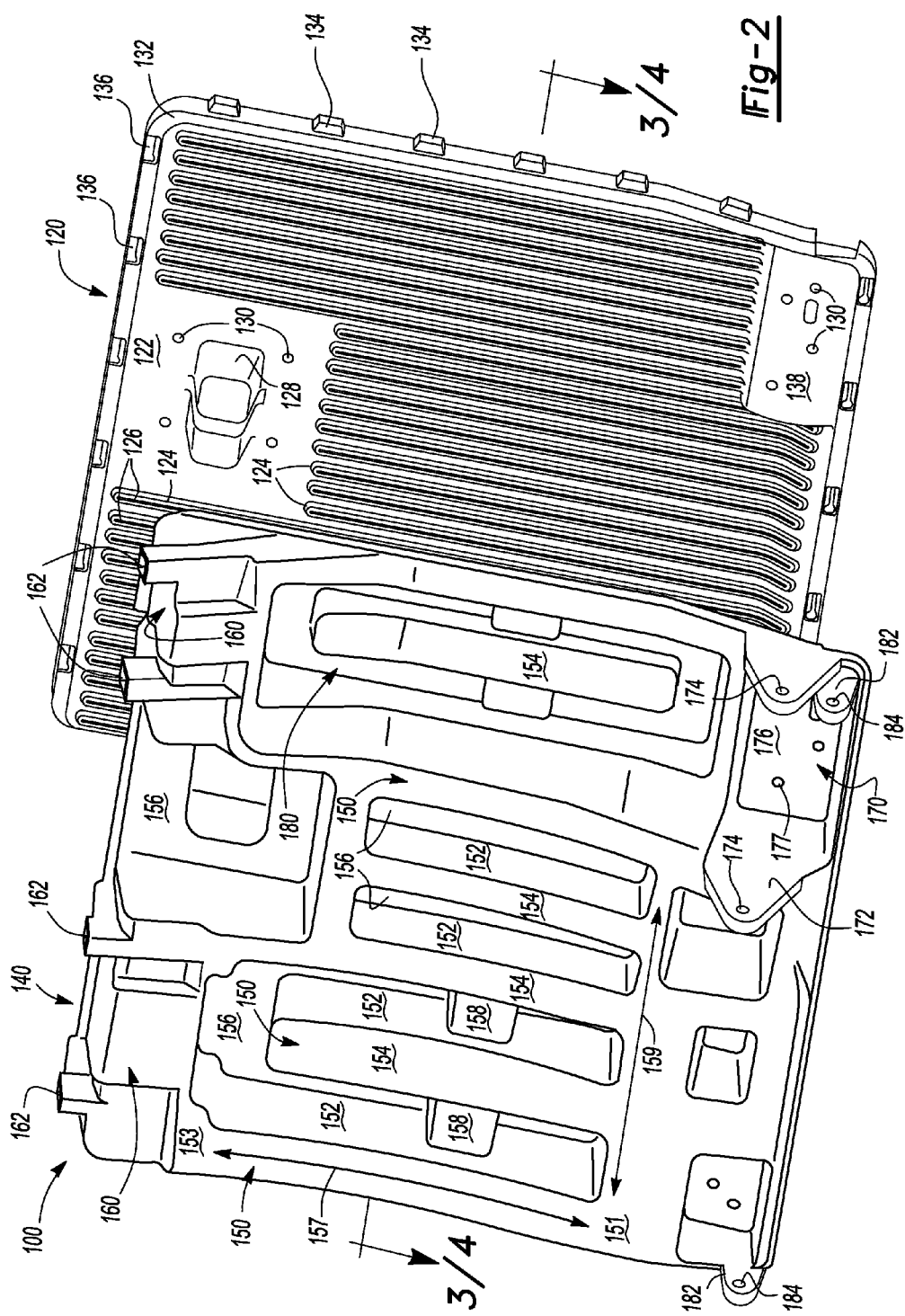
FIG. 2 is an exploded perspective view of a seat back support for an embodiment of the present invention.

Turning now to FIG. 2, a perspective view of a seat back support 100 is shown. It is appreciated that such a seat back support structure could be located within the seat back assembly 10 with cushion material attached thereto. The seat back support 100 can include a first panel 120 and a second panel 140. The first panel 120 can include a base portion 122 and a raised portion 124 extending therefrom. It is appreciated that the raised portion 124 can include a plurality of ribs that extend from the base portion 122. In the alternative, the raised portion 124 could be one continuous rib or a plurality of button shaped raised regions. As such, the exact structure of the raised portion 124 is not critical so long as it provides for a surface to contact a joining surface to be described in more detail below.

The raised portion 124 can have a joining material portion 126 that extends outwardly therefrom. In addition, the first panel 120 can have one or more channel portions 128 that extend from the base portion 122 in order to provide desired components, such as lock and latch hub covers and the like. The first panel 120 can optionally include one or more apertures 130 that afford for fasteners to be located therethrough. In the alternative, location pins can be placed at least partially through the apertures 130 in order to afford accurate location and proper placement of the seat back within a vehicle. The first panel 120 can also include an outer lip 132 and one or more tabs 134 and/or indentations 136. It is appreciated that the tabs 134 and/or the indentations 136 can be used for the attachment of trim material, foam material, and the like. In addition, an arm rest support surface 138 can be included as part of the first panel 120.

The second panel 140 can have a corrugated structure as shown in FIG. 2 with alternating channel portions 150 extending from joining surfaces to be described below. Stated differently, the second panel 140 can have a plurality of alternating channels and cavities that provide overall thickness and structural support to the second panel 140. The channel portions 150 include a side wall 152 and a channel surface 154 that extends between a pair of adjacent side walls 152. Additional structural features that provide support can be included, for example interconnecting channel portions 158.

The side walls can extend upwardly from a bottom surface 156 of the cavity regions and thereby provide the corrugated structure. In addition to the channel portions 150 providing an overall thickness to the seat back support 100, the channel portions 150 can be contoured in order to fit the general shape of an individual's back seated adjacent thereto. For example, the channel surface 154 can have a bottom end 151 and a top end 153. Between the bottom end 151 and the top end 153 can be a concave curvature along line 157 that can be dimensioned to fit a curvature of an individual's back. In addition, the second panel 140 can have a generally concave contour along line 159 which can be dimensioned to generally fit contour of an individual's back in a lateral direction.

Other features can be included within the second panel 140, for example an integral adjustable headrest support 160, an integral armrest attachment portion 170 and an integral armrest storage portion 180. The adjustable headrest portion 160 is integral with the remainder of the second panel 140 and can include at least two hollow channels 162 that are dimensioned to accept a grommet for an adjustable headrest (not shown). The integral arm rest attachment portion 170 can include a bracket 172 with an aperture 174. It is appreciated that the bracket 172 extends outwardly from a base portion 176 of the second panel 140. It is further appreciated that a pair of arm rests brackets 172 can extend from the base portion 176. The base portion 176 can have one or more apertures 177 that can align with alignment pins (not shown) extending from the arm rest portion 138 of the first panel 120. In the alternative, the apertures 177 can afford for an additional plate or other structure to be attached to the seat back support 100. For example and for illustrative purposes only, the second panel 140 can be provided without the armrest bracket 172 extending therefrom, and a steel plate with brackets can be attached to the base portion 176. In addition to the integral adjustable headrest support portion 160 and/or the arm rest support portion 170, the arm rest storage section 180 can be dimensioned such that the arm rest can be stored in that location when in the upright position. In addition, seat back pivot brackets 182 can be included with apertures 184, the brackets 182 with apertures 184 affording for the seat back support 100 to be pivotally attached to a seat bottom and provide pivotal movement of the seat back assembly 10.

Figure 3:
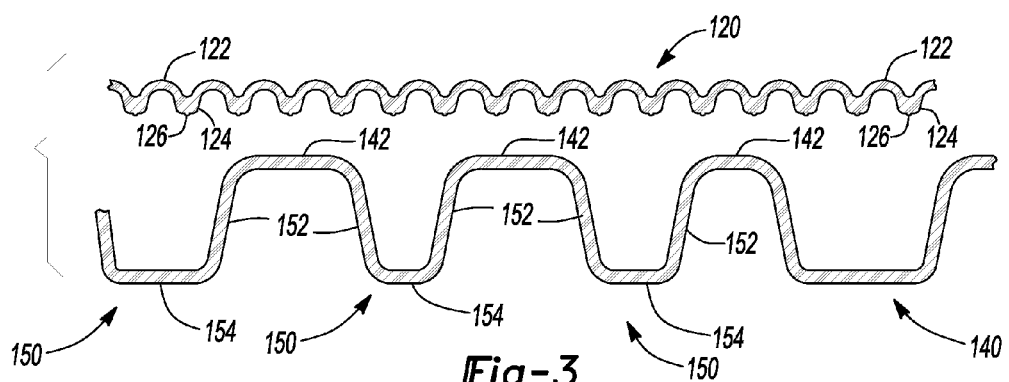
FIG. 3 is a cross-sectional view of the section 3-3 shown in FIG. 2.
Figure 4:
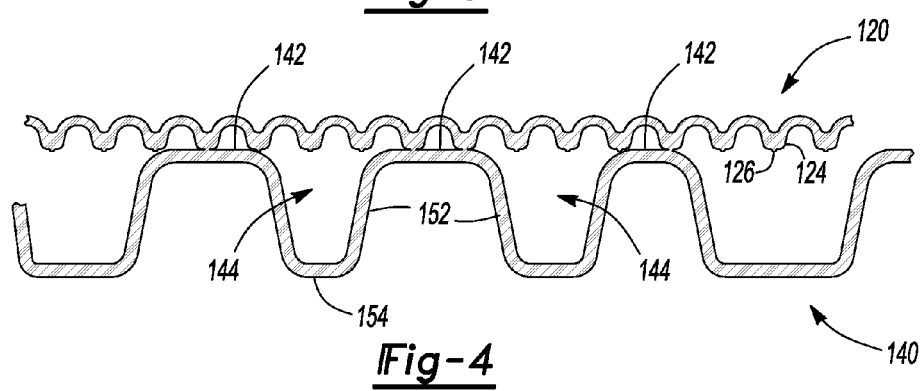
FIG. 4 is a cross-sectional view of the section 4-4 shown in FIG. 2 wherein a raised portion of a first panel is in contact with a joining surface of a second panel.

Turning now to FIGS. 3 and 4, a cross-sectional view of the sections 3-3 and 4-4 shown in FIG. 2, respectively, are illustrated. The first panel 120 has the base portion 122 with the raised portion 124 extending outwardly therefrom. In addition, the optional joining material portion 126 can extend outwardly from the raised portion 124. It is clear from FIGS. 3 and 4 that the raised portion 124 and/or the joining material portion 126 can come into contact with a joining surface 142 of the second panel 140. The joining surface 142 is interrupted by the channel portions 150 extending therefrom. The channel portions 150, as stated above, have side walls 152 extending between the joining surfaces 142 and the channel surface 154. In this manner, a corrugated structure is provided.

Looking specifically at FIG. 4, at least a portion of the raised portion 124 and/or joining material portion 126 has been melted and re-solidified while in contact with the joining surface 142. It is known to those skilled in the art, that the melting and re-solidification of the raised portion 124 and/or the joining material portion 126 while in contact with the joining surface 142 can provide a structural bond there between Likewise, the outer lip 132 of the first panel 120 and an outer lip of the second panel 140 (not shown) can be brought into contact with each other and have at least part of one or both lips melted and re-solidified and thus provide additional bonding surfaces for fixedly attaching the first panel 120 to the second panel 140.

The process for manufacturing the seat back support 100 can include providing the first panel 120 and the second panel 140. The first panel 120 and/or the second panel 140 can be made by any thin wall molding process, for example and for illustrative purposes only injection molding and injection compression molding. It is appreciated that other manufacturing techniques can be used to provide the first panel 120 and/or the second panel 140 having desirable structural features.

The first panel 120 can be produced or manufactured such that the raised region 124 extends outwardly from the base portion 120. In addition, the joining material portion 126 can be included such that it extends outwardly from the raised portion 124. Likewise, the second panel 140 can be manufactured such that it has the corrugated structure as illustrated in the figures with channel portions 150 extending from joining surfaces 142.

After the first panel 120 and second panel 140 have been provided, they can be placed adjacent to each other such that the raised portion 124 and/or the joining material portion 126 of the first panel is in contact with the joining surface 142 of the second panel. After proper alignment of the two panels relative to each other, at least a portion of the raised portion 124 and/or the joining material portion 126 is melted and allowed to re-solidify while in contact with the joining surface 142. In this manner, the raised portion 124 can be bonded to the joining surface 142.

It is appreciated that the melting of the raised portion 124 and/or the joining material portion 126 can be accomplished by vibration welding, ultrasonic welding, hot plate melting and the like. It is further appreciated that the vibration welding and/or the ultrasonic welding results in rapid displacement of the first panel 120 relative to the second panel 140. In addition, pressure can be applied to the first panel 120 and the second panel 140 such that contact between the raised portion 124 and/or the joining material portion 126 is maintained with the joining surface 142 during the joining process.

After the first panel 120 has been fixedly attached to the second panel 140, foam material, cushioning and the like can be attached to the seat back support 100 in order to provide the seat back assembly 10. In addition, the first adjustable headrest 30 and the second adjustable headrest 40 can be attached using the integral adjustable headrest support portions 160. Likewise, the arm rest 50 can be attached to the seat assembly 10 using the arm rest attachment brackets 172. In this manner, a seat back support 100 can be provided with the first panel 120 fixedly attached to the second panel 140 without the use of additional material.

The embodiments have been described for illustrative purposes only and are not meant to limit the scope of the invention in any way. Modifications, adjustments, different structural shapes, different attachment features and the like will be obvious to those skilled in the art and are within the scope of the invention. As such, the description of the invention is for teaching purposes and the scope of the invention is limited by the claims.

We claim:

1. A seat back support for seat cushioning to be attached thereto and provide a seat component, said seat back support comprising;
   a first panel having a base portion and a raised portion extending outwardly from said base portion, said raised portion having a joining material portion extending outwardly therefrom and at least part of said joining material portion having been melted and re-solidified;
   a second panel having a corrugated structure with a joining surface and a channel portion extending from said joining surface, said second panel fixedly attached to said first panel;
   said at least part of raised joining material portion having been melted and re-solidified in contact with said joining surface of said second panel, whereby said raised portion of said first panel is bonded to said joining surface of said second panel without the use of additional material.

2. The seat back of claim 1, wherein said second panel has an outer lip, said outer lip at least partially joined to said first panel without the use of additional material.

3. The seat back of claim 1, wherein said second panel has an integral seat back pivot bracket, said integral seat back pivot bracket dimensioned for said seat back to attach to a seat bottom portion.

4. The seat back of claim 1, wherein said raised portion is a rib extending outwardly from said base portion.

5. The seat back of claim 4, wherein said joining material portion extends outwardly from said rib.

6. The seat back of claim 1, wherein said second panel has a plurality of alternating joining surfaces and channel portions.

7. The seat back of claim 6, wherein said plurality of channel portions have contoured outer surfaces, said contoured outer surfaces dimensioned to generally fit a back portion of an individual sitting in a seat.

8. The seat back of claim 1, wherein said second panel has a first portion with a first thickness and a second portion with a second thickness.

9. The seat back of claim 8, wherein said first thickness is greater than said second thickness by more than 20%.

10. The seat back of claim 1, wherein said second panel has an integral headrest support portion, said integral headrest support portion having at least two hollow channels dimensioned to accept an adjustable headrest grommet.

11. The seat back of claim 10, wherein said second panel has two integral headrest support portions, each of said integral headrest support portions having at least two hollow channels dimensioned to accept an adjustable headrest grommet.

12. The seat back of claim 1, wherein said second panel has an integral armrest attachment bracket, said integral armrest attachment bracket dimensioned for an armrest to attach thereto and pivot about.

13. The seat back of claim 1, wherein said first panel and said second panel are made from a material selected from the group consisting of resin and thermoplastic polymer.

14. The seat back of claim 13, wherein said thermoplastic polymer is selected from the group consisting of polypropylene and polypropylene ethylene.

15. The seat back of claim 13, wherein said thermoplastic contains a material selected from the group consisting of glass and talc.

16. A seat back support for seat cushioning to be attached thereto and provide a seat component, said seat back support comprising:
   a first panel having a base portion and a raised portion extending outwardly from said base portion, said raised portion having a joining material portion extending outwardly therefrom and at least part of said joining material portion having been melted and re-solidified;
   a second panel having a corrugated structure with a joining surface and a channel portion extending from said joining surface, said second panel also having an integral headrest support portion with at least two hollow channels dimensioned to accept an adjustable headrest grommet;
   wherein said second panel is fixedly attached to said first panel and said joining material portion of said first panel is bonded to said joining surface of said second panel without the use of additional material.

17. The seat back of claim 16, wherein said second panel has a first portion with a first thickness and a second portion with a second thickness.

18. The seat back of claim 17, wherein said first thickness is greater than said second thickness by more than 20%.

19. The seat back of claim 16, wherein said first panel and said second panel are made from a material selected from the group consisting of resin and thermoplastic polymer.

20. A seat back support for seat cushioning to be attached thereto and provide a seat component, said seat back support comprising;
   a first panel having a base portion and a raised portion in the form of a rib extending outwardly from said base portion, said first panel also having a joining material portion extending outwardly from said rib and at least part of said joining material portion having been melted and re-solidified;

a second panel having a corrugated structure with a joining surface and a channel portion extending from said joining surface, said second panel fixedly attached to said first panel;

said at least part of said joining material portion having been melted and re-solidified in contact with said joining surface of said second panel, whereby said raised portion of said first panel is bonded to said joining surface of said second panel without the use of additional material.

* * * * *

UNITED STATES PATENT AND TRADEMARK OFFICE
CERTIFICATE OF CORRECTION

| | | |
|---|---|---|
| PATENT NO. | : 7,731,293 B1 | Page 1 of 1 |
| APPLICATION NO. | : 12/341692 | |
| DATED | : June 8, 2010 | |
| INVENTOR(S) | : Gregory Todd Donovan et al. | |

It is certified that error appears in the above-identified patent and that said Letters Patent is hereby corrected as shown below:

Column 7, line 49 claim 1 replace "raised" with --said--

Signed and Sealed this
Eighth Day of February, 2011

David J. Kappos
*Director of the United States Patent and Trademark Office*